(12) United States Patent
Hessenberger et al.

(10) Patent No.: US 8,844,118 B2
(45) Date of Patent: Sep. 30, 2014

(54) HIGH SLOT FILL MOTOR ARMATURE

(75) Inventors: Jeffrey C. Hessenberger, Neosho, WI (US); Alan Yeadon, Cedar Grove, WI (US); Brandon Verbrugge, Brookfield, WI (US); Michael Kolden, Wauwatosa, WI (US); Dennis J. Cerney, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 515 days.

(21) Appl. No.: 13/125,754

(22) PCT Filed: Oct. 23, 2009

(86) PCT No.: PCT/US2009/061910
§ 371 (c)(1),
(2), (4) Date: Apr. 22, 2011

(87) PCT Pub. No.: WO2010/048546
PCT Pub. Date: Apr. 29, 2010

(65) Prior Publication Data
US 2011/0198951 A1    Aug. 18, 2011

Related U.S. Application Data

(60) Provisional application No. 61/108,340, filed on Oct. 24, 2008.

(51) Int. Cl.
  *H02K 15/00* (2006.01)
  *H02K 15/09* (2006.01)
  *H02K 1/14* (2006.01)

(52) U.S. Cl.
  CPC .............. *H02K 15/09* (2013.01); *H02K 1/148* (2013.01)

USPC ............... 29/596; 29/597; 29/598; 29/564.5; 29/732; 242/433.2

(58) Field of Classification Search
USPC ..................... 29/596–598, 732, 564.6–564.8; 310/214–215
See application file for complete search history.

(56) References Cited

U.S. PATENT DOCUMENTS

2,781,465 A     2/1957  Schuff
3,130,335 A  *  4/1964  Rejda ............................ 310/215
(Continued)

OTHER PUBLICATIONS

Office Action from the Canadian Intellectual Property Office for Application No. 2741686 dated Aug. 1, 2013 (3 pages).

(Continued)

*Primary Examiner* — Minh Trinh
(74) *Attorney, Agent, or Firm* — Michael Best & Friedrich LLP

(57) ABSTRACT

A method of manufacturing a motor for a power tool includes providing an armature configured to be coupled to a shaft. The armature includes a yoke and a first tooth and a second tooth that extend radially outward from the yoke to define a slot between the first tooth and the second tooth. Each of the first tooth and the second tooth include an inner end adjacent the yoke and an outer end opposite the inner end. The method further includes coupling a first wire guide member to the outer end of the first tooth, coupling a second wire guide member to the outer end of the second tooth, winding wire into the slot, after winding wire into the slot, compressing the wire radially into the slot, uncoupling the first wire guide member from the first tooth, and uncoupling the second wire guide member from the second tooth.

16 Claims, 18 Drawing Sheets

(56) References Cited

U.S. PATENT DOCUMENTS

| | | | |
|---|---|---|---|
| 3,389,865 | A | 6/1968 | Stuckey |
| 3,468,019 | A | 9/1969 | Brown et al. |
| 6,226,857 | B1 * | 5/2001 | Becherucci .................... 29/598 |
| 6,580,193 | B2 * | 6/2003 | Yoshikawa et al. ........... 310/215 |
| 6,741,004 | B2 * | 5/2004 | Senoo et al. ................... 310/215 |
| 6,782,600 | B2 * | 8/2004 | Yamazaki et al. .............. 29/596 |
| 7,194,794 | B2 * | 3/2007 | Arendes et al. ................. 29/596 |

OTHER PUBLICATIONS

PCT/US2009/061910 International Search Report and Written Opinion dated Dec. 15, 2009 (6 pages).

Office Action from the Australian Patent Office for Application No. 2009308214 dated Jan. 17, 2013 (3 pages).

* cited by examiner

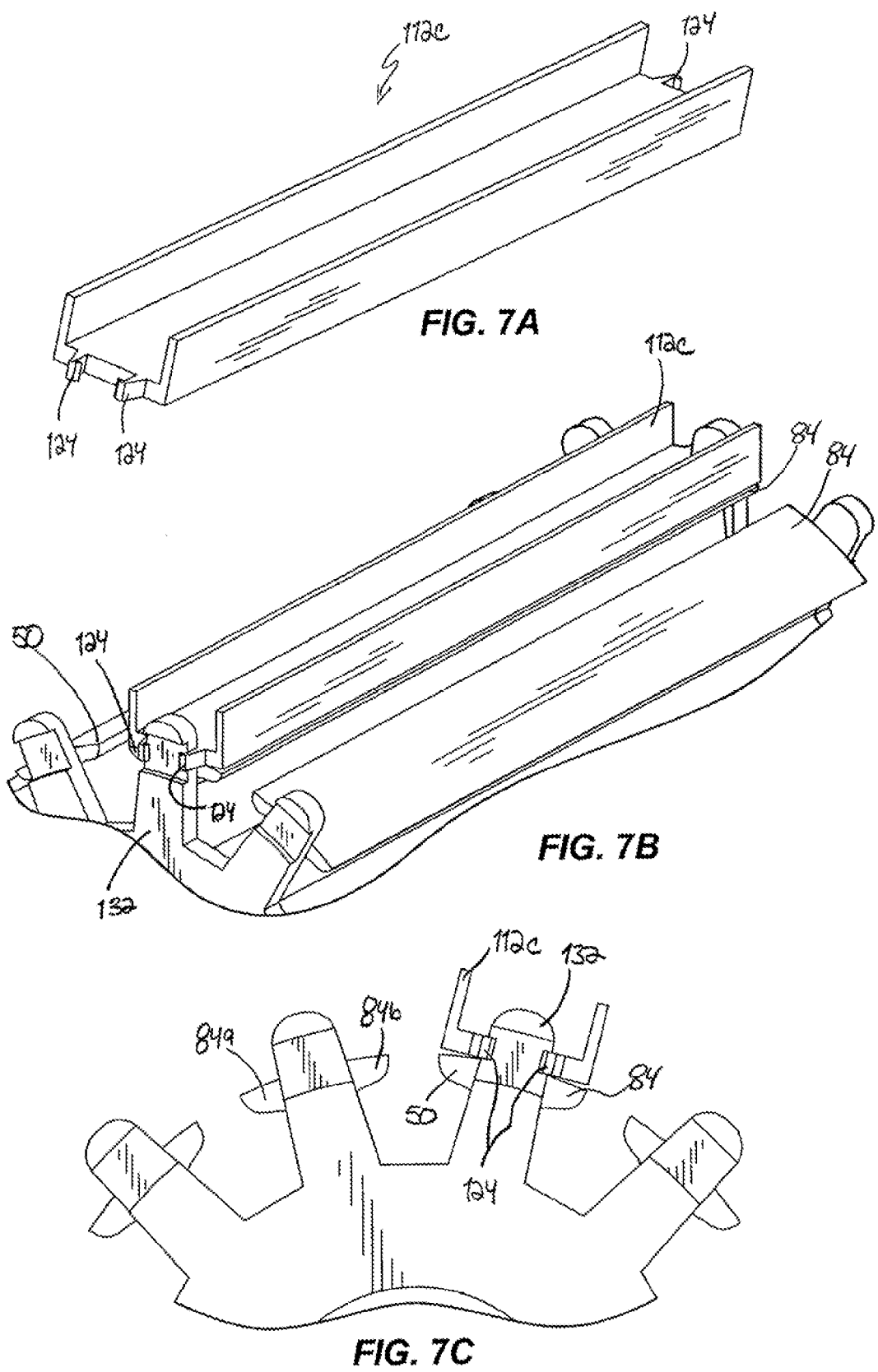

HIGH SLOT FILL MOTOR ARMATURE

CROSS-REFERENCE TO RELATED APPLICATIONS

This application claims priority to U.S. Provisional Patent Application No. 61/108,340, filed Oct. 24, 2008, the entire contents of which are incorporated by reference herein.

BACKGROUND

The invention relates to electric motors and, more particularly, to an armature for an electric motor.

Alternating current (AC) or direct current (DC) universal motors, permanent magnet motors, and brushless motors are commonly used in electrical power tools, such as, for example, circular saws, grinders, reciprocating saws and drills, and other types of equipment. Generally, these motors are a high-power, light-weight drive source for electric tools.

Typically, a universal motor includes a field or stator stack and a rotatable arbor or shaft having an armature mounted thereon. Current flowing through a coil of the stator stack creates a magnetic field that interacts with the armature to rotatably drive the arbor in a direction of rotation. A tool element, such as a saw blade or drill bit, is coupled to the arbor and driven by the motor.

SUMMARY

In one embodiment, the present invention provides a method of manufacturing a motor for a power tool including providing an armature configured to be coupled to a shaft. The armature includes a yoke and a first tooth and a second tooth that extend radially outward from the yoke to define a slot between the first tooth and the second tooth. Each of the first tooth and the second tooth include an inner end adjacent the yoke and an outer end opposite the inner end. The method further includes coupling a first wire guide member to the outer end of the first tooth, coupling a second wire guide member to the outer end of the second tooth, winding wire into the slot, after winding wire into the slot, compressing the wire radially into the slot, uncoupling the first wire guide member from the first tooth, and uncoupling the second wire guide member from the second tooth.

In another embodiment, the invention provides a method of manufacturing a motor for a power tool including providing an armature configured to be coupled to a shaft. The armature includes a yoke and a first tooth and a second tooth that that extend radially outward from the yoke to define a slot between the first tooth and the second tooth. Each of the first tooth and the second tooth include an inner end adjacent the yoke and an outer end opposite the inner end. The method further includes winding wire into the slot, after winding wire into the slot, winding wire radially past the outer end of the first tooth and the outer end of the second tooth, and after winding wire radially past the outer end of the first tooth and the outer end of the second tooth, compressing the wire radially into the slot.

In another embodiment, the invention provides a method of manufacturing a motor for a power tool including providing an armature configured to be coupled to a shaft having an axis of rotation. The armature includes a yoke and a first tooth and a second tooth that extend radially outward from the yoke to define a slot between the first tooth and the second tooth. Each of the first tooth and the second tooth include an inner end adjacent the yoke and an outer end opposite the inner end. The method further includes winding wire into the slot, after winding wire into the slot, compressing the wire radially into the slot while guiding the wire into the slot using a first wire guide member and a second wire guide member, uncoupling a first wire guide member from the first tooth, and uncoupling a second wire guide member from the second tooth.

In yet another embodiment, the invention provides a power tool that includes a shaft configured to drive a tool element, and the shaft is rotatable about an axis. The tool further includes an armature coupled to the shaft. The armature includes a yoke and a first tooth that extends radially outward from the yoke. The first tooth includes an inner end adjacent the yoke and a tooth tip that defines an outer end of the first tooth opposite the inner end. A second tooth extends radially outward from the yoke to define a slot between the first tooth and the second tooth. The second tooth includes an inner end adjacent the yoke and a tooth tip that defines an outer end of the second tooth opposite the inner end. Wire is wound around the armature and disposed within the slot. A slot fill area of the slot is defined as a cross-sectional area of the slot radially inward of the tooth tip of the first tooth and radially inward of the tooth tip of the second tooth taken perpendicular through the axis of the shaft. A wire fill area is defined as the total cross-sectional area of the wire within the slot fill area. A slot fill percentage is defined as the slot fill area divided by the wire fill area, and the slot fill percentage is at least 70 percent.

Other aspects of the invention will become apparent by consideration of the detailed description and accompanying drawings.

BRIEF DESCRIPTION OF THE DRAWINGS

FIG. 7A illustrates a slot fill device for the armature core of the motor of FIG. 2 according to another embodiment of the invention.

FIG. 7B illustrates the slot fill device of FIG. 7A coupled to an armature core of the motor of FIG. 2.

FIG. 7C is an end view of FIG. 7B.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 1:
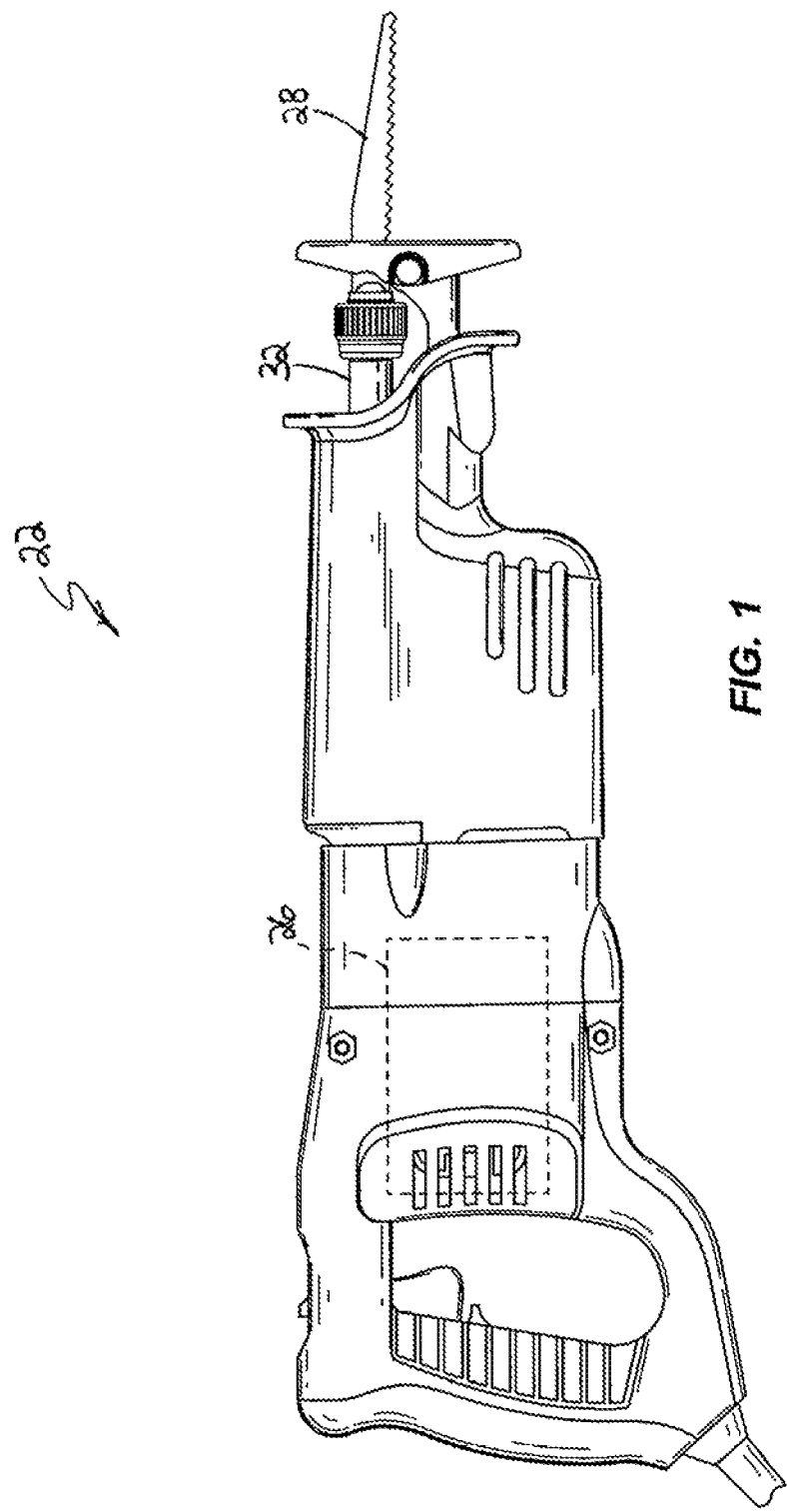
FIG. 1 is a side view of a power tool according to one embodiment of the invention.

FIG. 1 illustrates a power tool 22 having an electric motor 26 configured to drive a tool element 28 via an arbor 32. In the illustrated embodiment, the power tool 22 is a reciprocating saw such that the motor 26 is configured to reciprocate the arbor 32 and the tool element 28, which is a saw blade. In other embodiments, the power tool can be any suitable power tool such as, circular saws, grinders, drills, and other types of equipment.

Figure 2:
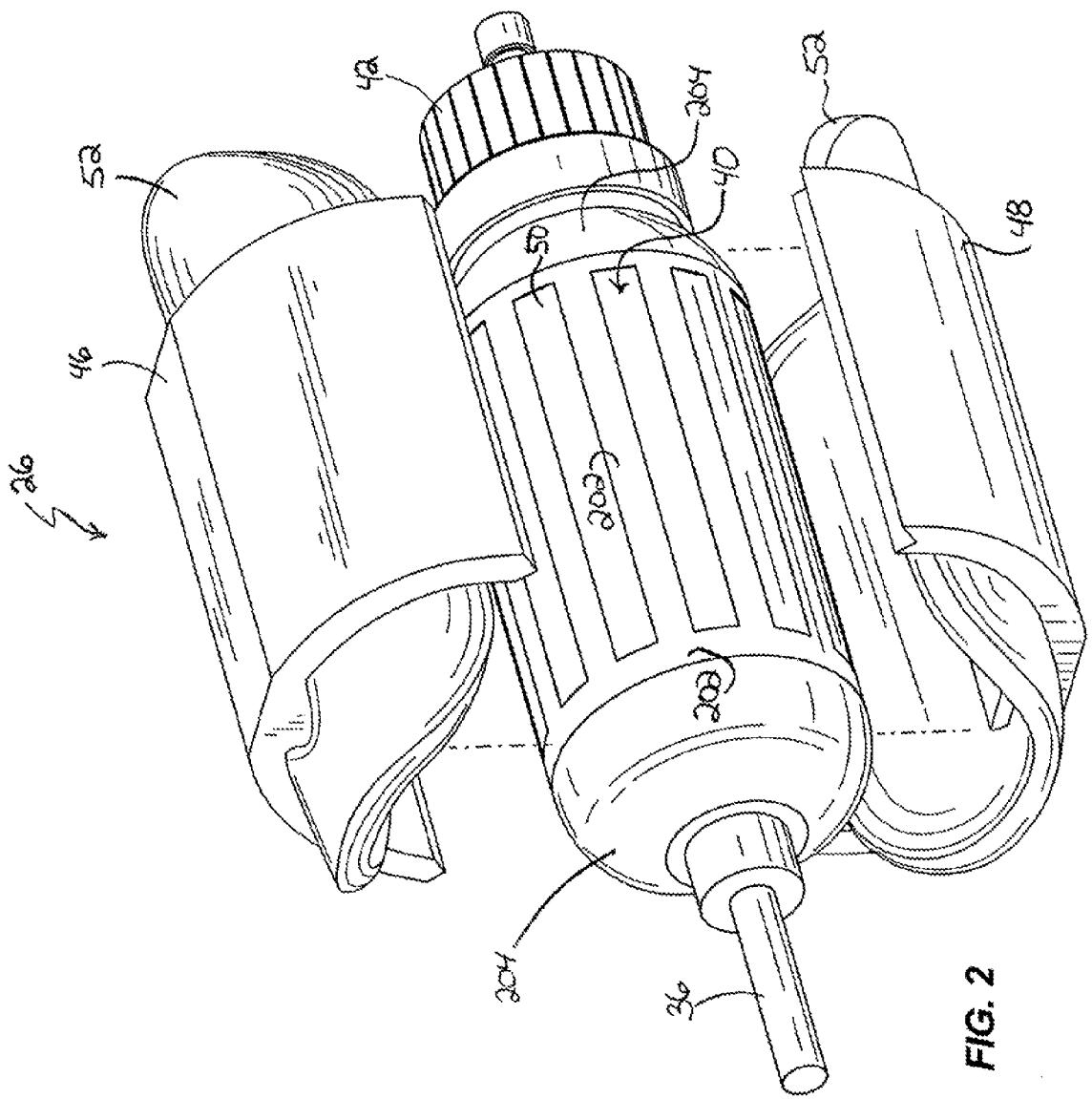
FIG. 2 is a partially exploded view of a motor of the power tool shown in FIG. 1.

Referring to FIG. 2, the electric motor 26 includes a rotatable shaft or arbor 36 supporting an armature 40 and a commutator 42. The motor 26 further includes a two-piece field stack or stator stack including al first and second stack parts 46, 48 that are coupled to form a backiron of a stator of the motor 26. Each stack part 46, 48 is configured to receive wire windings 52 to create field coils.

Figure 3:
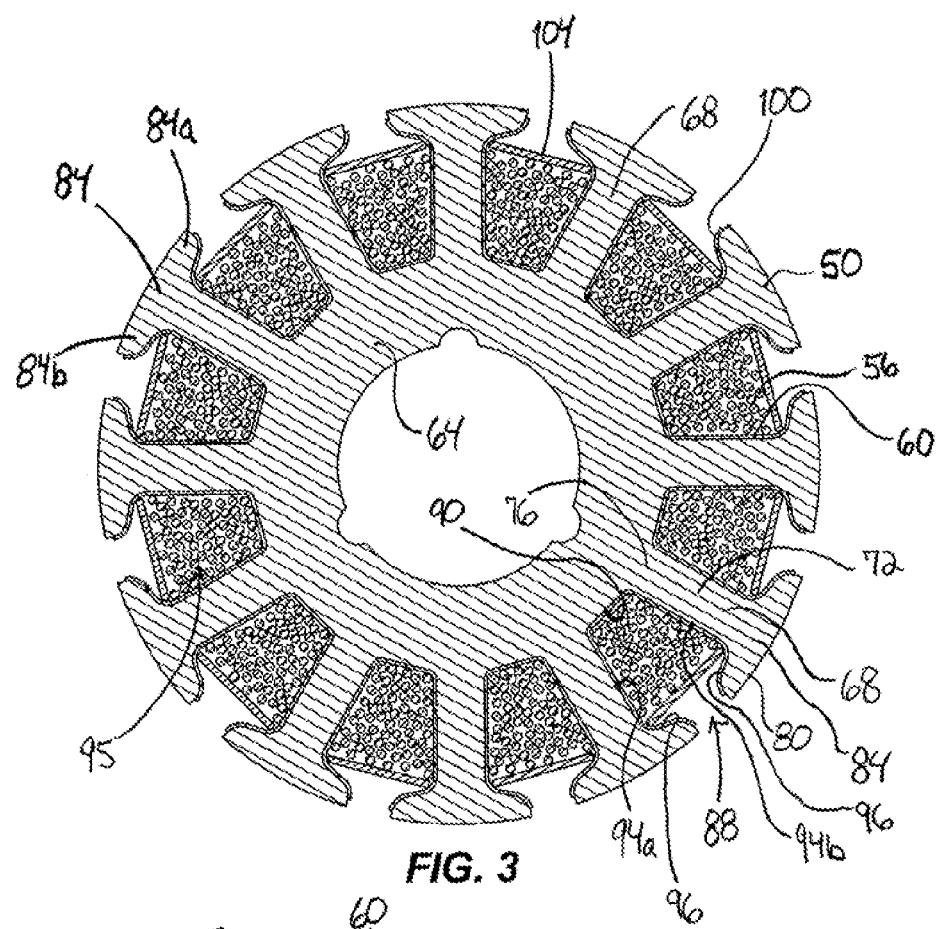
FIG. 3 is a cross-sectional view of an armature of a motor manufactured using a current manufacturing method.

As shown in FIG. 3, the armature 40 includes a core 50 that is configured as a wire winding support structure. One or more coil wires 56 or windings are wound on the core 50 and retained in slots 60. The wires are typically copper wires; however, in other embodiments, other conductive material may be used. The wire may be wound using a plurality of manufacturing methods. In some embodiments, the wire is wound with precision winding. The precision winding winds the wire such that the wire does not typically need to be compressed following the winding. In some embodiments, the wire is wound with precision winding and still further compressed into the slot. In other embodiments, the wire is not precision wound and is compressed further into the slots and encapsulated. In still other embodiments, the wire is not precision wound, but is further compressed into the slot without encapsulation.

Figure 4:
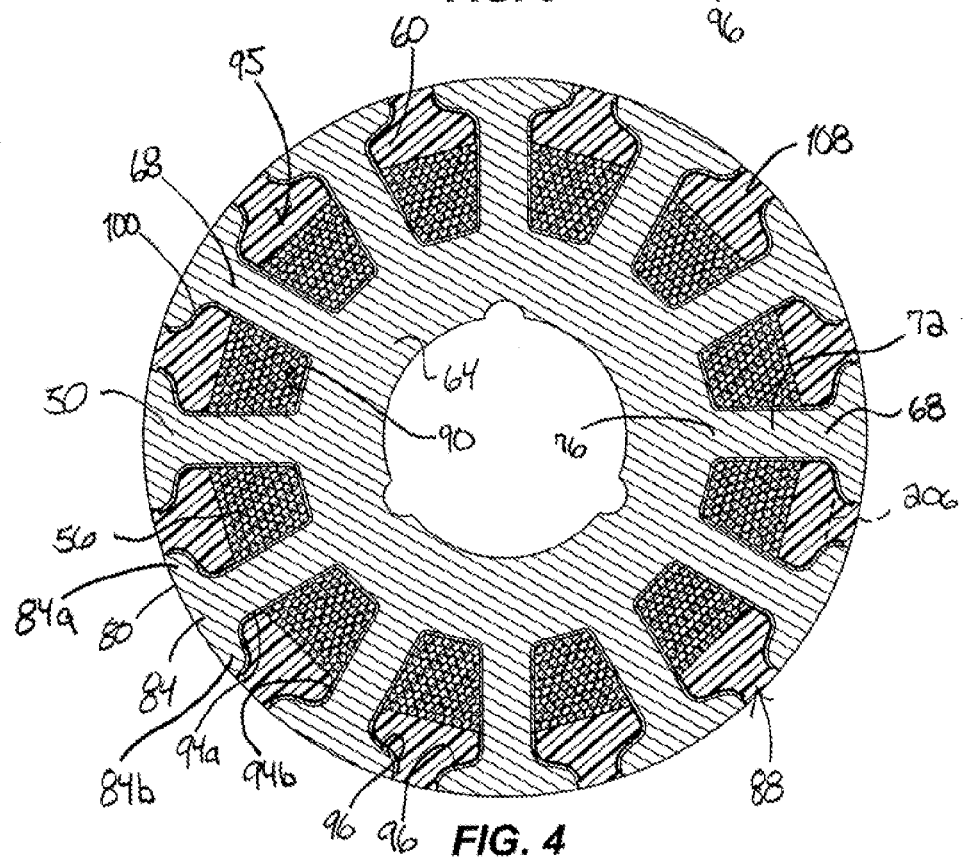
FIG. 4 is a cross-sectional view of an armature of a motor manufactured using an alternative current manufacturing method.

FIGS. 3-4 illustrate cross-sectional views of a portion of the armature core 50. The core 50 includes a yoke 64 and a series of slots 60 defined by T-shaped teeth 68. Each tooth 68 includes a tooth body 72 extending radially from the yoke 64 and having an inner end 76 adjacent the yoke 64 and an outer end 80 opposite the inner end 76. A tooth tip 84 forms the tangential portion of the T-shaped tooth 68 and includes a right tooth tip 84a and a left tooth tip 84b. Tooth tips 84a, 84b extend from the tooth body 72 of the tooth 68 into a slot opening 88. The slot opening 88, a slot bottom 90 coinciding with the yoke 64, a first slot sidewall 94a and a second slot sidewall 94b define the slot fill area 95 (FIG. 5C) radially inward of an underside 96 of the tooth tips 84a, 84b. In some embodiments, a slot liner 100 lines the slot 40 with insulation material. The slot liner 100 may be powder, powder paint, or other insulating coating or material. The slots 60 and the teeth 68 are configured to receive and support wire wound about the core 50. The core 50 may be a laminated stack of individual laminations; however, in other embodiments, the core may be formed of a powdered metal or other material.

The right and left tooth tips 84a, 84b are configured to receive either of a top stick or slot wedge 104 (FIG. 3), encapsulation material 108 (FIG. 4), or other material to compress the wire. As shown in FIG. 3, the top stick 104 fills a portion of the volume (or slot fill area 95) between the wire 56 and the slot opening 88. The top stick 104 may be plastic or other suitable material, and the encapsulation material 108 may be thermoset resin, thermoplastic, or similar encapsulating material. The encapsulation material 108 is configured to compress or otherwise pack the wire winding 56 into the slot 60. The increased pressure provides compression to the wire windings 56. Compressing the windings 56 allows additional wire windings to be added to the slot 60. In still other embodiments, a varnish may be used to fill the area between the wires to maintain wire rigidity. The varnish may also function as an insulator. Without compressing the wire windings, less wire winding is used than in a core using encapsulation or compression. In still other embodiments, iso-static pressing may be used to compress and insulate the wire after winding. In still other embodiments, a pressurized fluid, including but not limited to varnish, oil, water, or plastic, may be applied to the wire to compress the wires into the slot.

When wire is compressed, extra wire windings are possible, in addition to more turns, larger wire, or more conductors. However, extra windings may cause excess wire to build on the outside of the outer diameter of the core prior to compressing the wire. Fill devices, such as wire guide members and tooth tip members, may be attached to the core to hold the excess wire and guide the excess wire into the slot during compression.

FIGS. 5A-19A illustrate various embodiments of wire guide members, high slot fill wire guide members, and tooth tip members. Once any extra winding is complete and the wires have been compressed, encapsulated, or otherwise put into the slot, the wire guide member may be machined or otherwise ground down to the original diameter of the core.

Figure 5A:
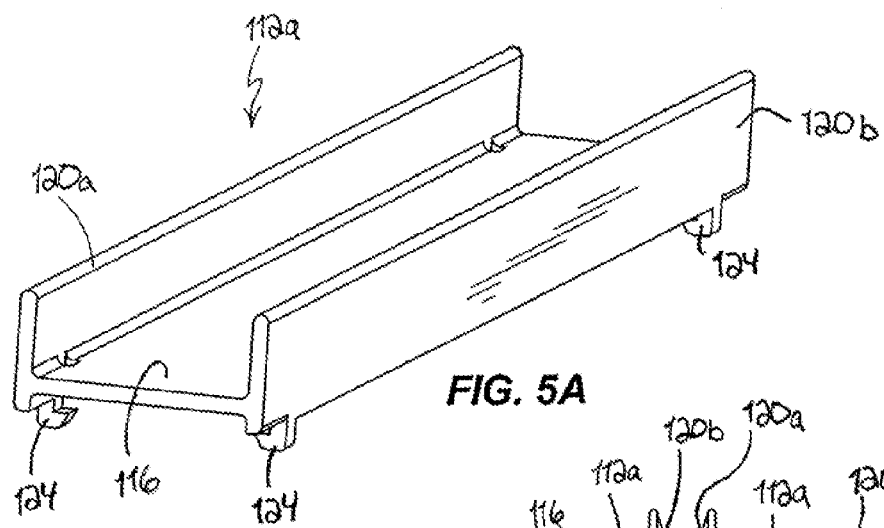
FIG. 5A illustrates a slot fill device for an armature core of the motor of FIG. 2 according to one embodiment of the invention.
Figure 5B:
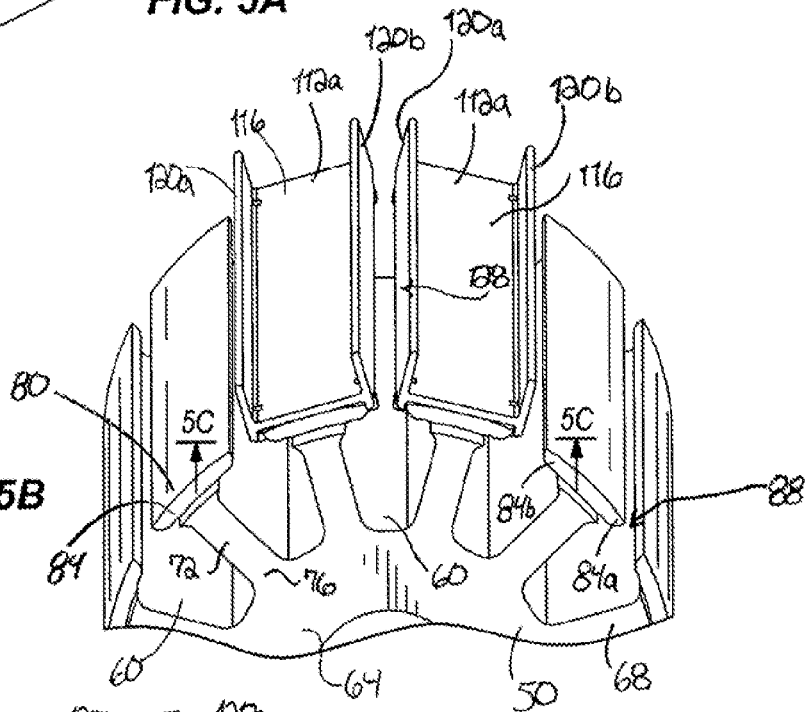
FIG. 5B illustrates the slot fill device of FIG. 5A coupled to an armature core of the motor of FIG. 2.
Figure 5C:
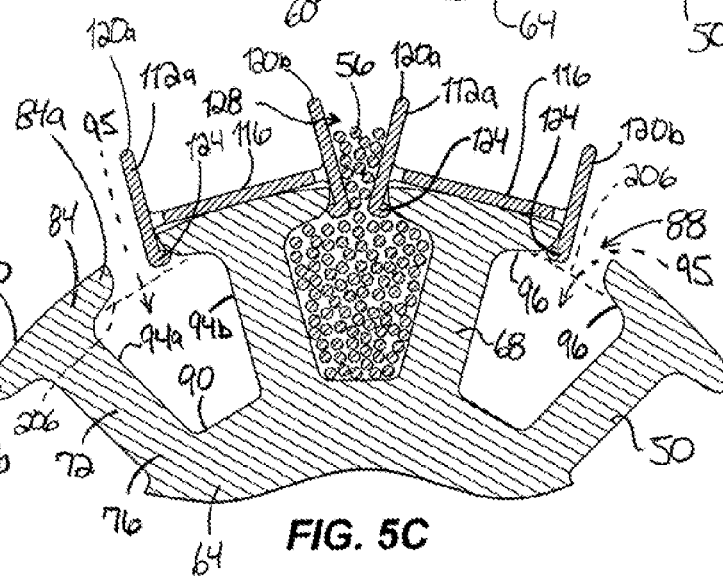
FIG. 5C is a cross-section view of FIG. 5B taken along line 5C-5C of FIG. 5B illustrating wire wound around the armature core before a compression step.

FIGS. 5A-5C illustrate one embodiment of a wire guide member 112a configured to hold the wires 56 after winding and guide excess wire 56 winding into the slot 60 during molding, compression, and forming. The wire guide member 112a includes a bottom wall 116 configured to interface with the outer end 80 of the tooth tip 84 along the entire length of the tooth tip 84. The wire guide member 112a further includes a pair of sidewalls 120a, 120b extending substantially perpendicular from the bottom wall 116. Each side wall 120a, 120b includes at least one tab 124 configured to interface longitudinally over the tooth tip 84 and along an axial length of the tooth tip 84. The interference fit provides a secure hold for the wire guide member 112a onto the tooth tip 84. The wire guide member 112a is manufactured by injection molding or other manufacturing process and configured to hold excess wire in area 128 between adjacent wire guide members 112a.

Figure 5D:
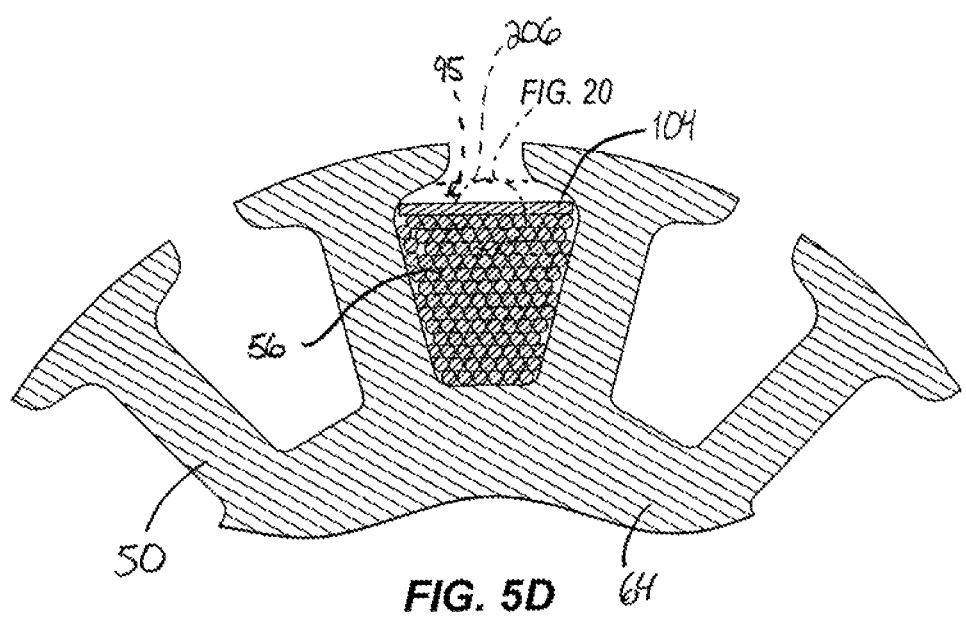
FIG. 5D is a partial cross-section view illustrating wire wound around the armature cure after the compression step.

During one method of manufacturing, the wire guide members 112a are coupled to the tooth tips 84. Then, the wire 56 is wound into the slot 60 such that the wire 56 is wound radially past the outer end 80 of the teeth 68 and into the excess wire area 128 (FIG. 5C). Then, the wire 56 is compressed through the slot openings 88, such as by push a slot wedge 104 (FIG. 5D), molding, encapsulating, and the like. Following the excess winding process, encapsulation or other post-winding processing forces the wire 56 further into the slots 60, and the wire guide members 112a are removed from the core by machining or other process (FIG. 5D).

Figure 6A:
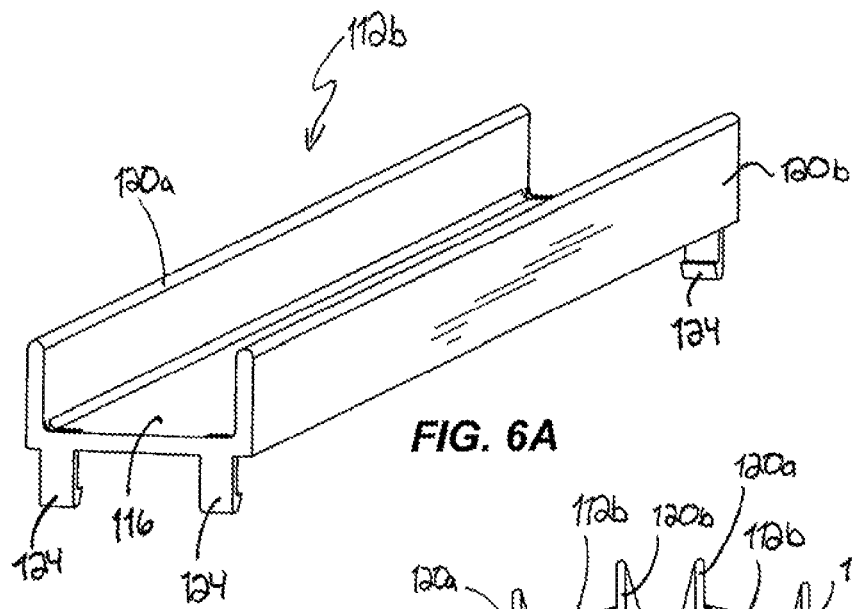
FIG. 6A illustrates a slot fill device for the armature core of the motor of FIG. 2 according to another embodiment of the invention.
Figure 6B:
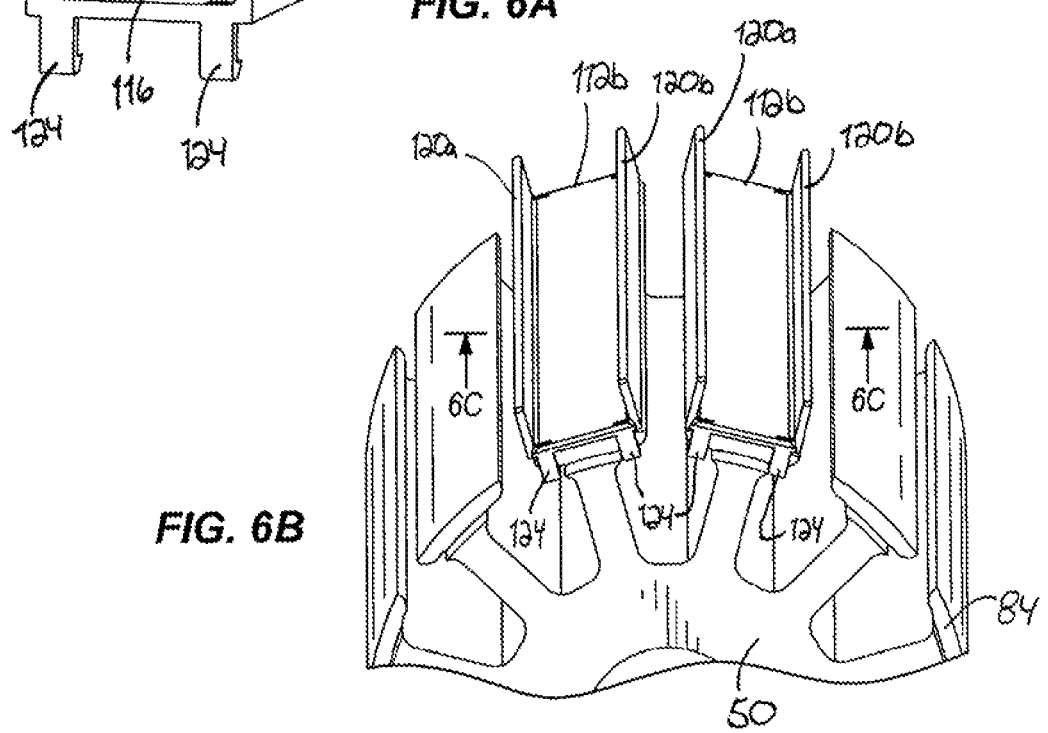
FIG. 6B illustrates the slot fill device of FIG. 6A coupled to an armature core of the motor of FIG. 2.
Figure 6C:
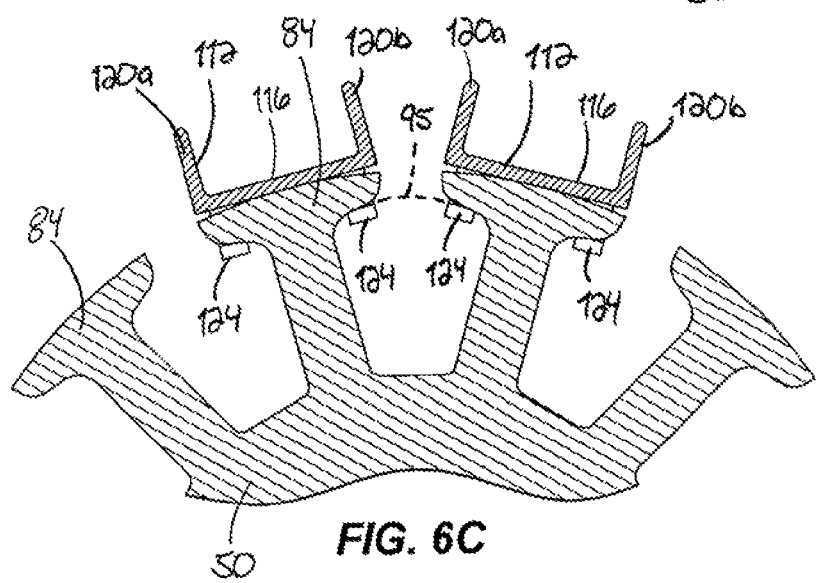
FIG. 6C is a cross-section view of FIG. 6B taken along line 6C-6C of FIG. 6B.

FIGS. 6A-6C illustrate another embodiment of a wire guide member 112b configured to hold or otherwise guide excess wire winding into the slot 60. The wire guide member 112b includes tabs 124 on each end of the wire guide member 112b configured to interface with axial ends of the tooth tip 84. The end interference fit configuration increases slot fill area 95 because the tabs 124 are located on the ends of the wire guide member 112b rather than along the length of the guide member 112b.

FIGS. 7A-7C illustrate another wire guide member 112c configured to interface with an extended end spider 132 of the armature. The end spider 132, also known as the end lamination, end fiber, spider, or end insulator is configured to substantially mirror the shape of the armature core and provide support to any slot insulator that may extend from the core. A width of the end spider 132 is substantially equal to or slightly less than the width of the tooth body to enable efficient wire winding. The wire guide member 112c includes tabs 124 on the ends of the wire guide member 112c configured to interface with the end spider 132. Both the extended end spider 132 and the wire guide member 112c may be ground or machined down following any post-winding processing.

Figure 8A:
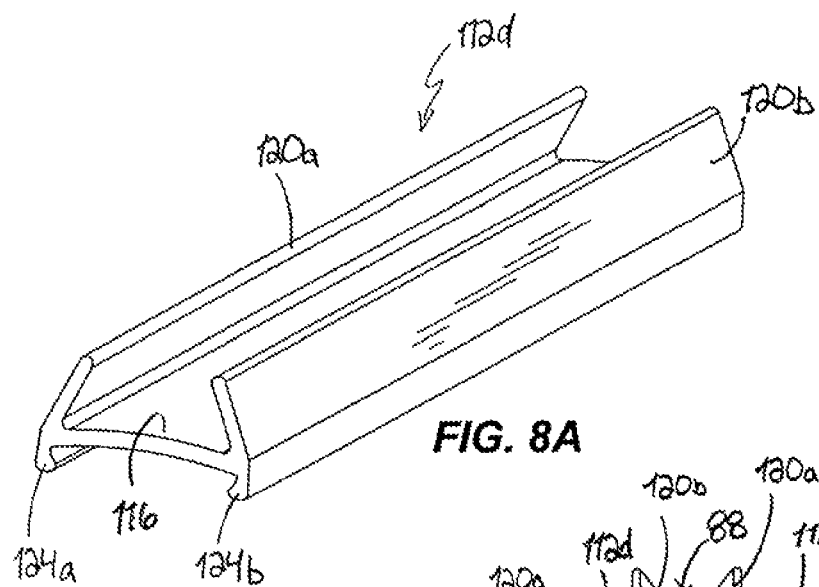
FIG. 8A illustrates a slot fill device for the armature core of the motor of FIG. 2 according to another embodiment of the invention.
Figure 8B:
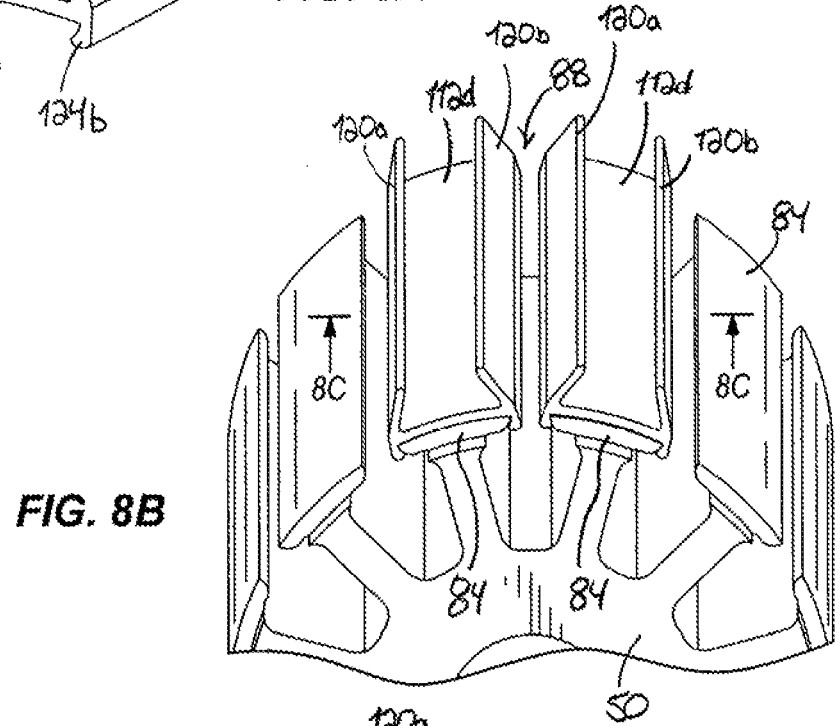
FIG. 8B illustrates the slot fill device of FIG. 8A coupled to an armature core of the motor of FIG. 2.
Figure 8C:
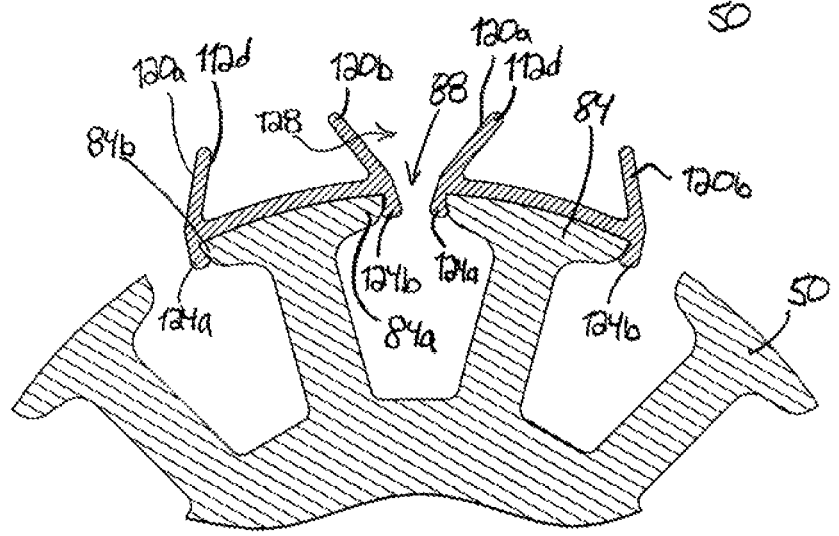
FIG. 8C is a cross-section view of FIG. 8B taken along line 8C-8C of FIG. 8B.

FIGS. 8A-8C illustrate another embodiment of the wire guide member 112d including sidewalls 120a, 120b that bend away from the slot opening 88 (i.e., towards each other). The bent sidewalls 120a, 120b are configured to allow more excess wire winding into the excess wire area 128 area between the sidewalls 120a, 120b of adjacent wire guide members 112d. The sidewalls may be bent at a number of different angles. Lower lips 124a, 124b extend downwardly from the bottom wall 116 and along a length of the wire guide member 112d. The lower lips 124a, 124b are configured to interface with the tooth tip 84 by a snap-fit, slide interference or other friction hold. In other embodiments, the lower lips may extend only a portion of the length of the wire guide member. In other embodiments, the lower lips may be positioned at intervals along the length of the wire guide member. In still other embodiments, the lower lips may extend downward along a portion of the tooth. The lower lips 124a, 124b may protect the wire 56 (FIG. 5C) from scrapping on the tooth tips 84a, 84b during compression of the wire 56.

Figure 9A:
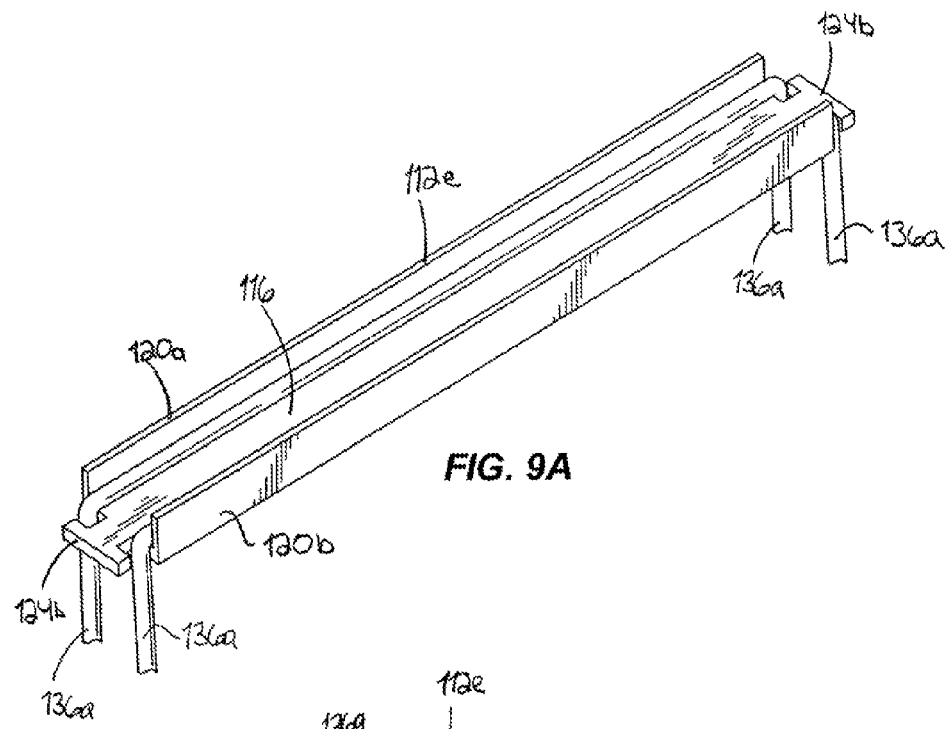
FIG. 9A illustrates a slot fill device for the armature core of the motor of FIG. 2 according to another embodiment of the invention.
Figure 9B:
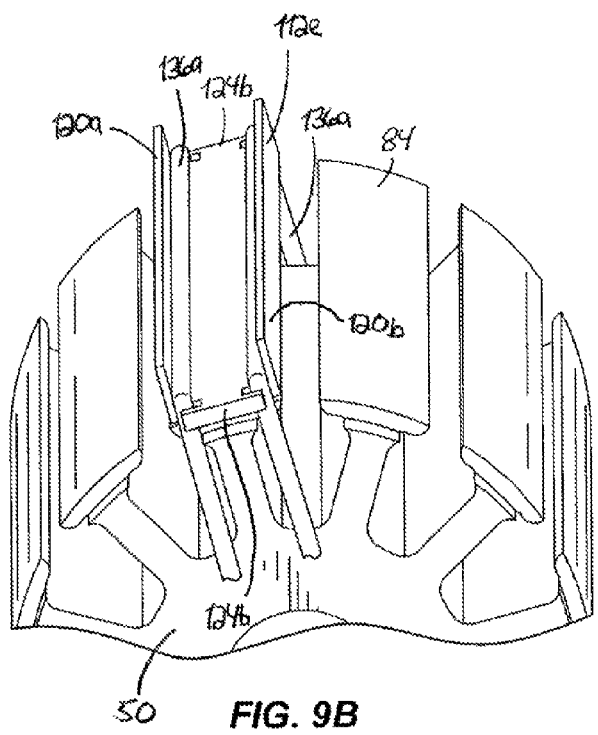
FIG. 9B illustrates the slot fill device of FIG. 9A coupled to an armature core of the motor of FIG. 2.
Figure 10A:
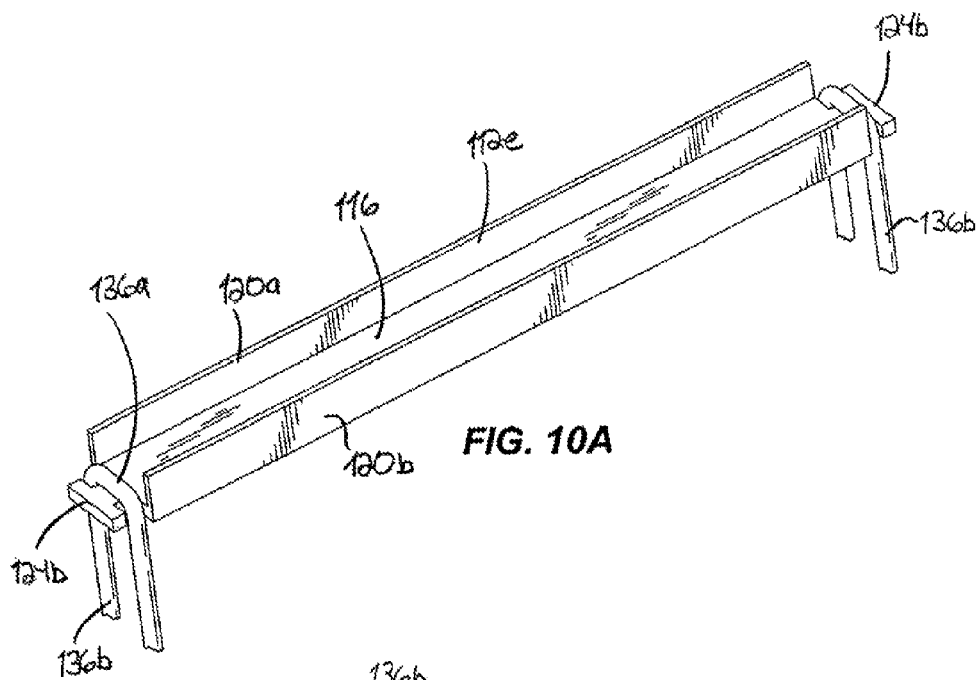
FIG. 10A illustrates a slot fill device for the armature core of the motor of FIG. 2 according to another embodiment of the invention.
Figure 10B:
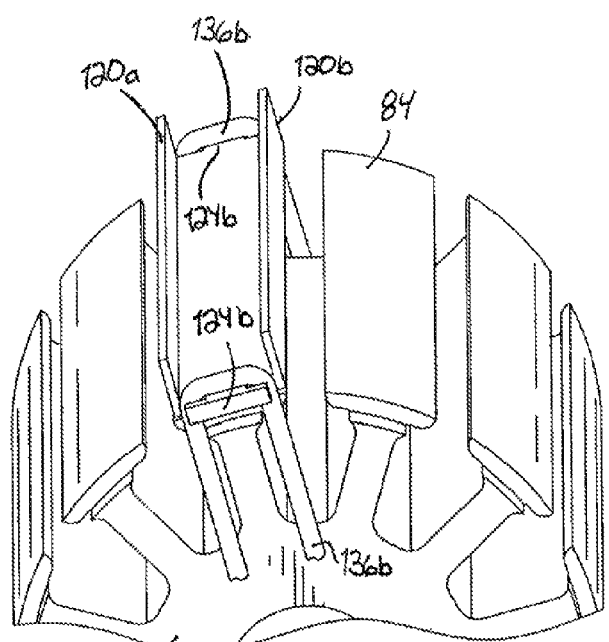
FIG. 10B illustrates the slot fill device of FIG. 10A coupled to an armature core of the motor of FIG. 2.

FIGS. 9A, 9B, 10A, and 10B illustrate a removable and reusable wire guide member 112e. As shown in FIG. 9A, the wire guide member 112e includes a tab 124b extending longitudinally from the bottom wall 116 of the wire guide member 112e and configured to receive a filament 136a. In other embodiments, the wire guide member may not include a tab. The filament 136a is flexible to permit the wire guide member 112e to be coupled and removed from the core 50 without grinding or another machining process. The filament 136a is configured to couple the wire guide member 112e to the tooth tip 84. The wire guide member 112e is removably coupled to the core with the filament 136a wound longitudinally along the wire guide member 112e about tab 124b. As shown in FIGS. 10A and 10B, the wire guide member 112e is removably coupled to the core with a plurality of filament 136b wound about the outer ends of the wire guide member 112e at the tabs 124b. Although the wire guide member is shown as removable; in other embodiments, the wire guide member may be ground or machined off once the excess wire winding is complete. The filaments 136a are configured to be covered by the wire windings.

In the embodiments shown in FIGS. 5A-10B and in still other embodiments, the space between the bottom wall 90 (FIG. 5C) and each side wall 94a, 94b may be filled with additional wire guide member material.

Figure 11:
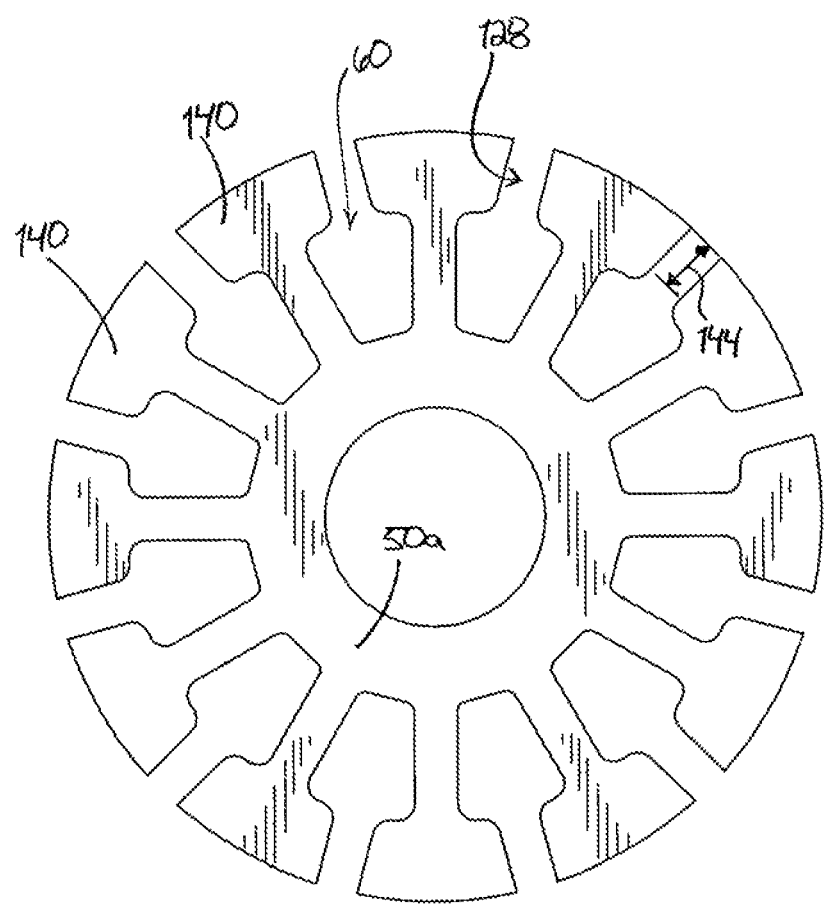
FIG. 11 illustrates an armature core including a slot fill feature according to another embodiment of the invention

FIG. 11 illustrates an alternative armature core 50a that can be used with the motor 26 of FIGS. 1 and 2. The armature core 50a (FIG. 11) includes extended lamination teeth 140 configured to hold and guide excess wire into slots 60. The extended part of the tooth 140 includes any portion 144 of the tooth that extends past the original outer diameter of the teeth 68 and tooth tips 84 of the core 50 of FIGS. 3-10B. Accordingly, the extended lamination teeth 140 (FIG. 11) form wire guide members to guide excess wire into the slots 60. The portion 144 forms a wire guide member during compression of the wire and provides an excess wire area 128, as discussed above with regard to FIGS. 5A-5D. Following wire winding and post-winding compression or other processing, the extensions and excess material (i.e., portion 144) are ground, cut off, or machined from the core. Also, any of the wire guide members discussed above with regard to FIGS. 5A-10B can be used with the extended teeth 140 to further increase the size of the excess wire area 128.

Figure 12A:
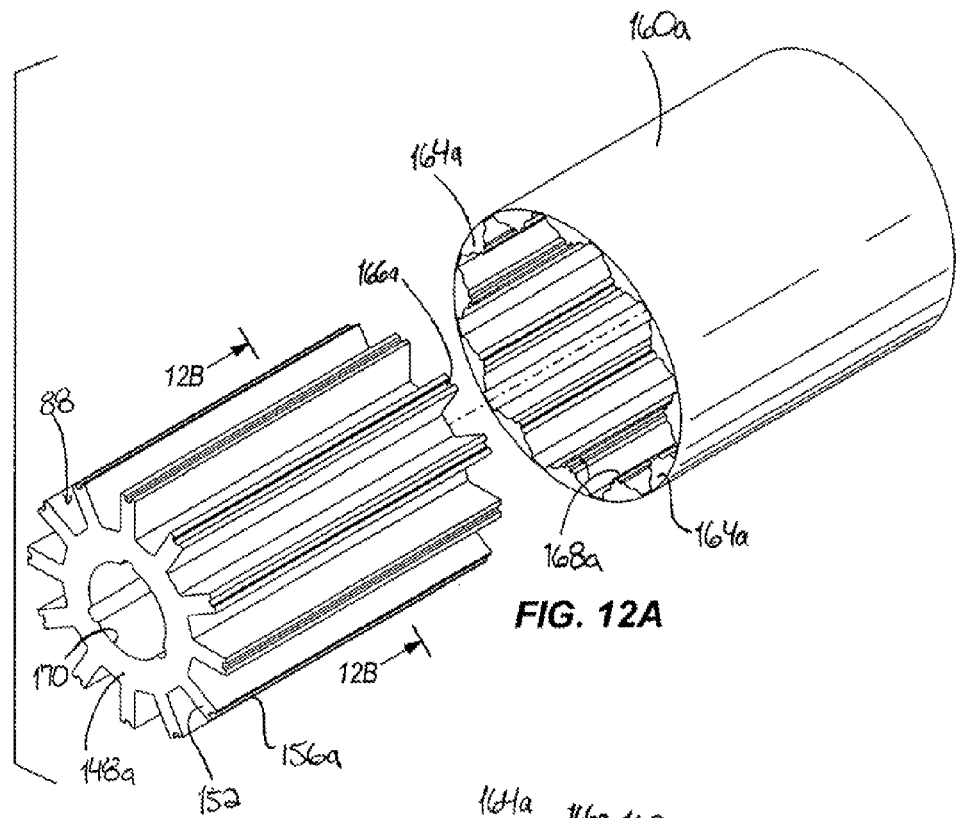
FIG. 12A is an exploded view of an armature core with separated tooth tips according to another embodiment of the invention.
Figure 12B:
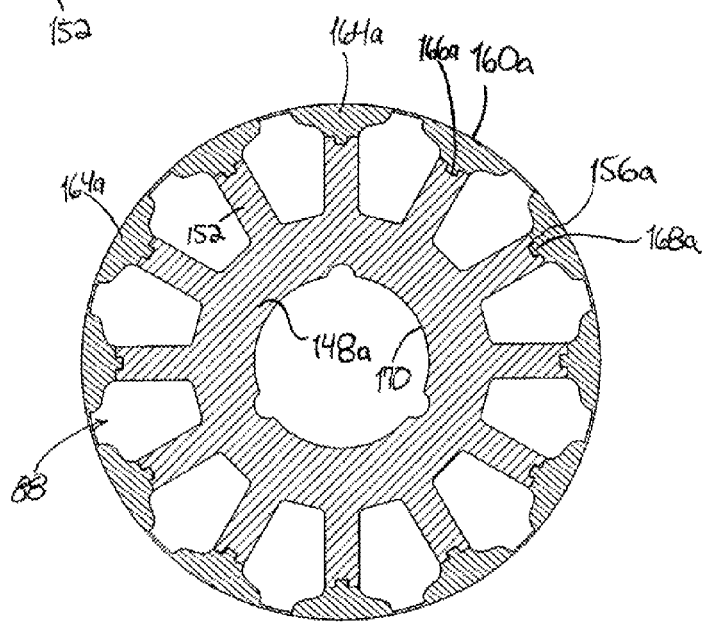
FIG. 12B is a cross-sectional of the armature core and the separated tooth tips of FIG. 12B assembled and taken along line 12B-12B of FIG. 12A.

FIGS. 12A-14B illustrate tooth tip-less stacks, or armature cores, and tooth tip members. As shown in FIGS. 12A and 12B, a tooth tip-less stack 148a includes a broader slot opening 88. A tooth 152 includes an interference tip 156a configured to receive an outer stack 160a having tooth tip inserts 164a. The outer stack 160a is configured to receive the core 148a after wire winding for improved wire lay. As shown in FIG. 12B, the interference tip 156a includes a groove 166a at an outer end of the tooth 152. The tooth tips 164a have a corresponding tongue 168a configured to be secured in the groove 166a with press forces. The tooth tip-less stack 148a further includes a yoke aperture 170 which decreases material usage during manufacturing of the core 148a. In other embodiments, the care may not include the yoke aperture 170, for example, the embodiment illustrated in FIGS. 14A-14B does not include a yoke aperture.

Figure 13A:
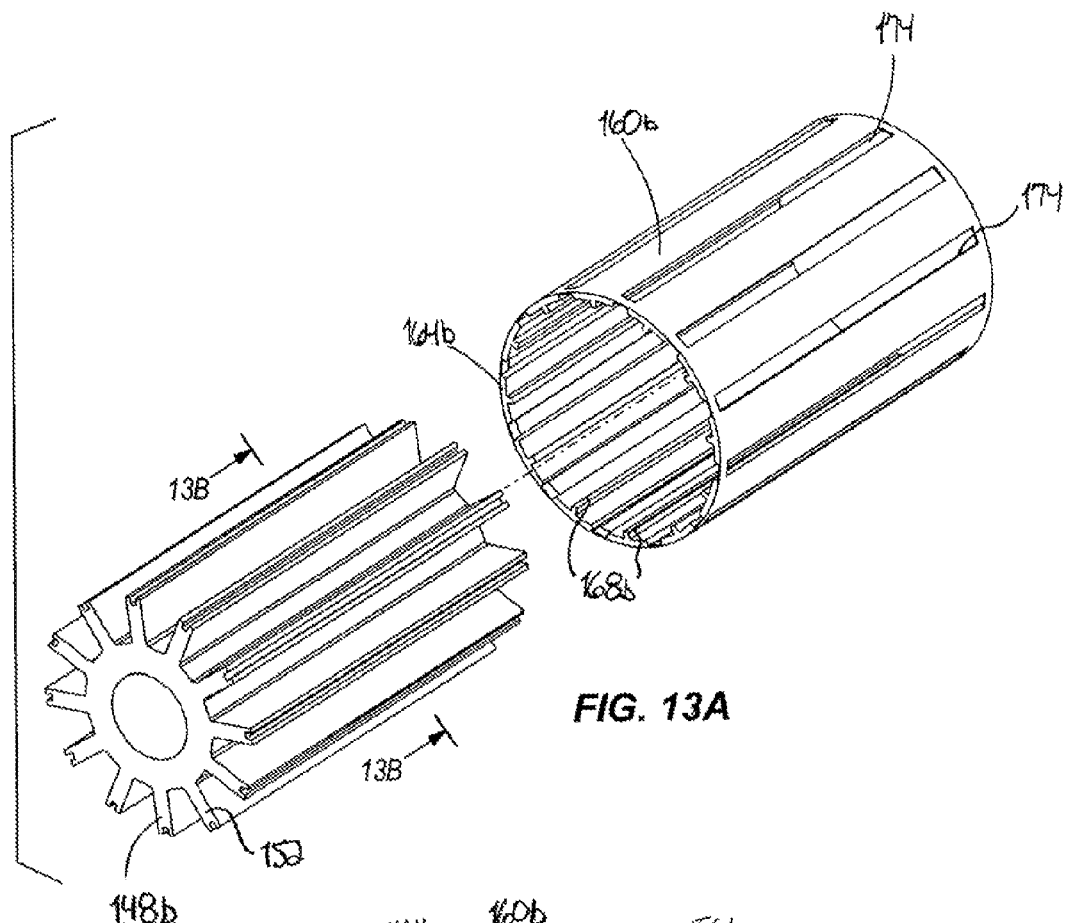
FIG. 13A is an exploded view of an armature core with separated tooth tips according to another embodiment of the invention.
Figure 13B:
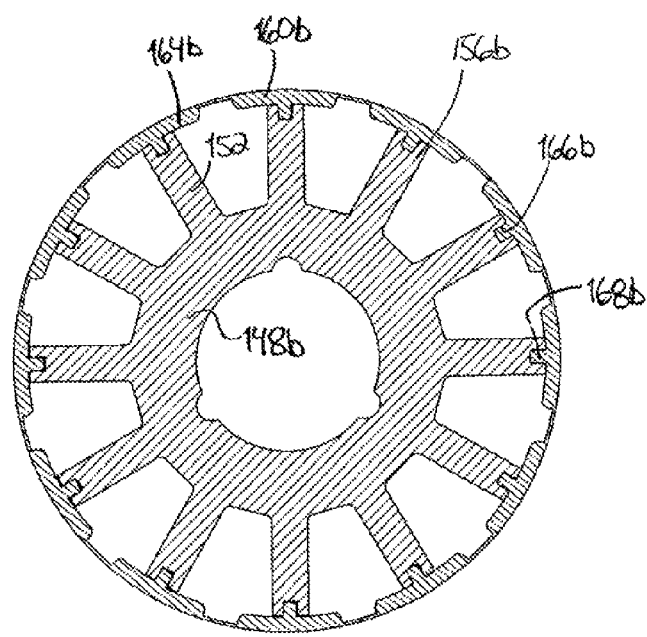
FIG. 13B is a cross-sectional of the armature core and the separated tooth tips of FIG. 13B assembled and taken along line 13B-13B of FIG. 13A

FIGS. 13A-13B illustrate a tooth tip-less core 148b and an outer stack 160b having tooth tip members 164b and including a plurality of slot-shaped, longitudinal apertures 174. The apertures 174 provide that the outer stack 160b is substantially completely connected only about the circumference of the outer stack 160b at both ends of the core 148b. The apertures 174 provide for increased magnetic performance as compared to an enclosed design. The apertures 1174 also allow increased thermal performance by allowing heat release. The slot-shaped apertures 174 are substantially the same width as the slot opening of the core 50 shown in FIGS. 3-4. In other embodiments, the tooth tip members 164b may be substantially completely connected around the circumference at different intervals along the length of the apertures 174. The apertures provide that less material is used during manufacturing of the tooth tip member. The interference tip 156b includes rectangular grooves 166b configured to receive rectangular tongues 168b of the outer stack 160b.

Figure 14A:
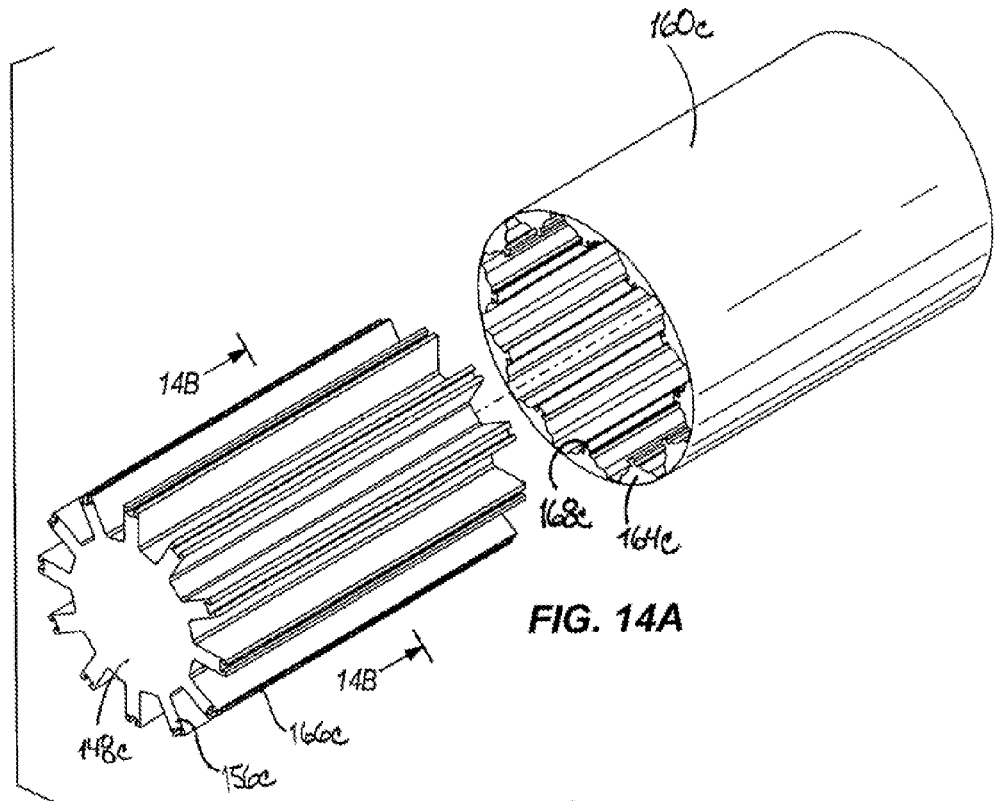
FIG. 14A is an exploded view of an armature core with separated tooth tips according to another embodiment of the invention.
Figure 14B:
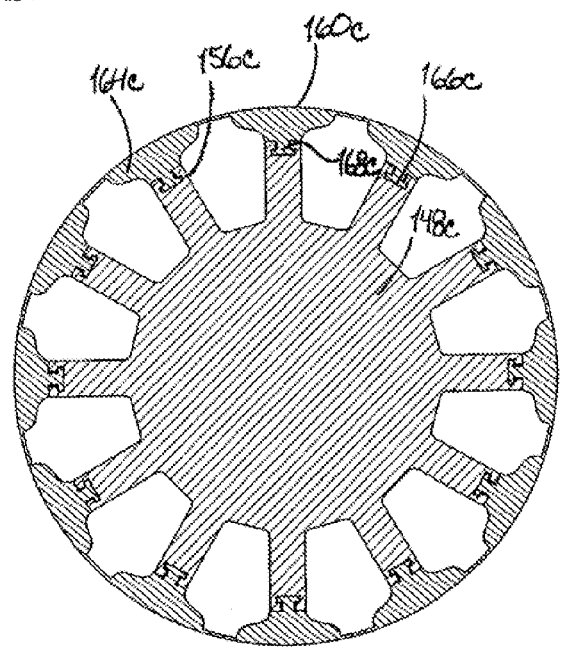
FIG. 14B is a cross-sectional of the armature core and the separated tooth tips of FIG. 14B assembled and taken along line 14B-14B of FIG. 14A

Although, FIGS. 12A-13B illustrate rectangular grooves 166a, 166b and rectangular tongues 168a, 168b, in other embodiments, the grooves and the tongues can have other suitable configurations. For example, FIGS. 14A and 14B illustrate a tooth tip-less core 148c including an interference tip 156c having a T-shaped groove 166c, and an outer stack 160c including tooth tip members 164c having corresponding T-shaped tongues 168c configured to be secured in the T-shaped grooves 166c. In yet other embodiments, the groove and corresponding tongue may be other shapes, including but not limited to triangular, circular, ovular, and the like.

In still other embodiments, the tooth tip-less core may include extended teeth configured to increase the area for wire winding. Once the excess wire is wound and compressed, the extended teeth are ground or otherwise machined to the outer diameter of the non-extended core. A tooth tip member may be applied after any excess tooth length is ground.

Figure 15:
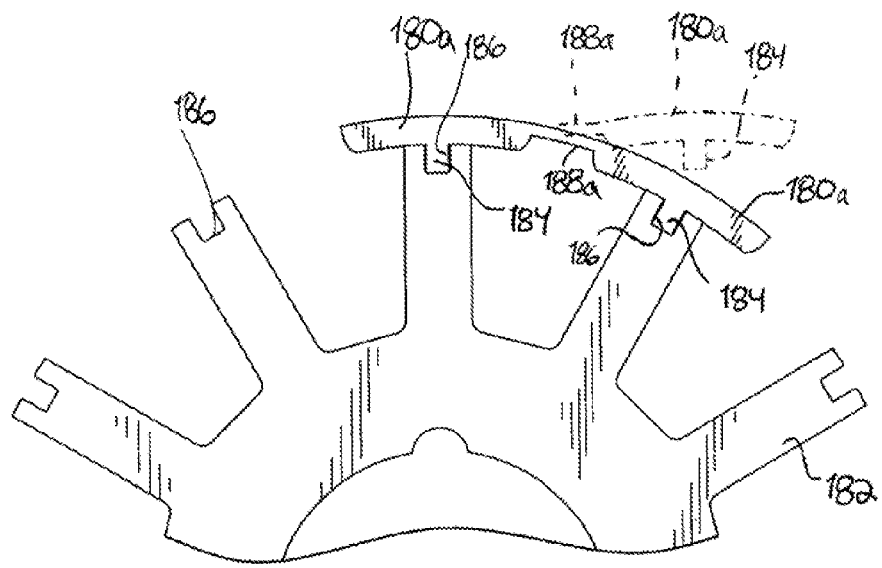
FIG. 15 is an end view of an armature core with separated tooth tips according to another embodiment of the invention.

Referring to FIG. 15, a plurality of tooth tips 180a are stamped from one contiguous piece of material for use with a tooth tip-less core 182. To apply the tooth tips 180a to the core 182, the tooth tips 180a are bent around the core 182 and secured with a tongue 184 and groove 186 configuration. A live hinge 188a is formed between adjacent tooth tips 180a as the tooth tips 180a are bent around the core 182. In one embodiment, the bendable, stamped design requires less material than a stamped core. The bendable, stamped design may also provide that no machining or grinding is necessary to reduce the outer diameter of the core following winding. The bending process is generally precise as the live hinge 188a allows the stamped tooth tip 180a to be applied to the core 182.

Figure 16:
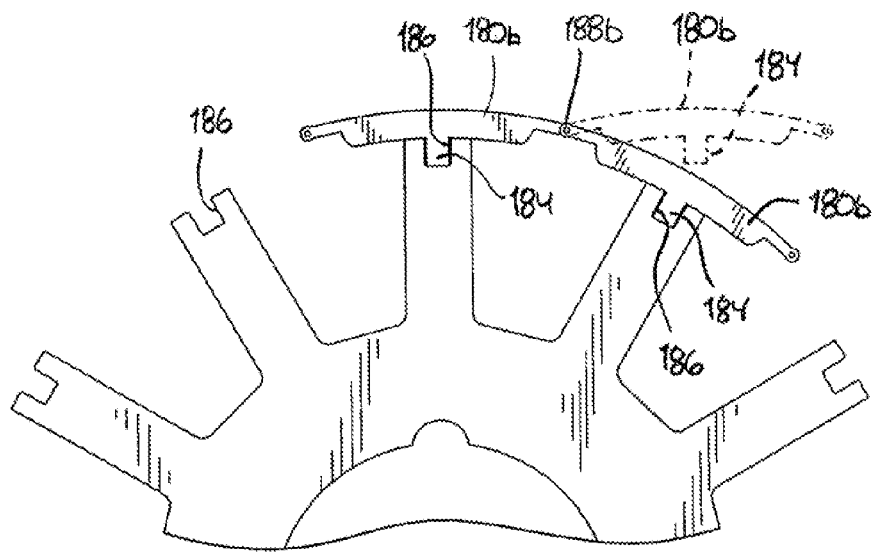
FIG. 16 is an end view of an armature core with separated tooth tips according to another embodiment of the invention.

In other embodiments and as shown in FIG. 16, a stamped tooth tip design 180b includes a hinge 188b between adjacent tooth tips configured to bend the tooth tip member 180b around the core 182. A precise die is used to punch the core.

Figure 17:
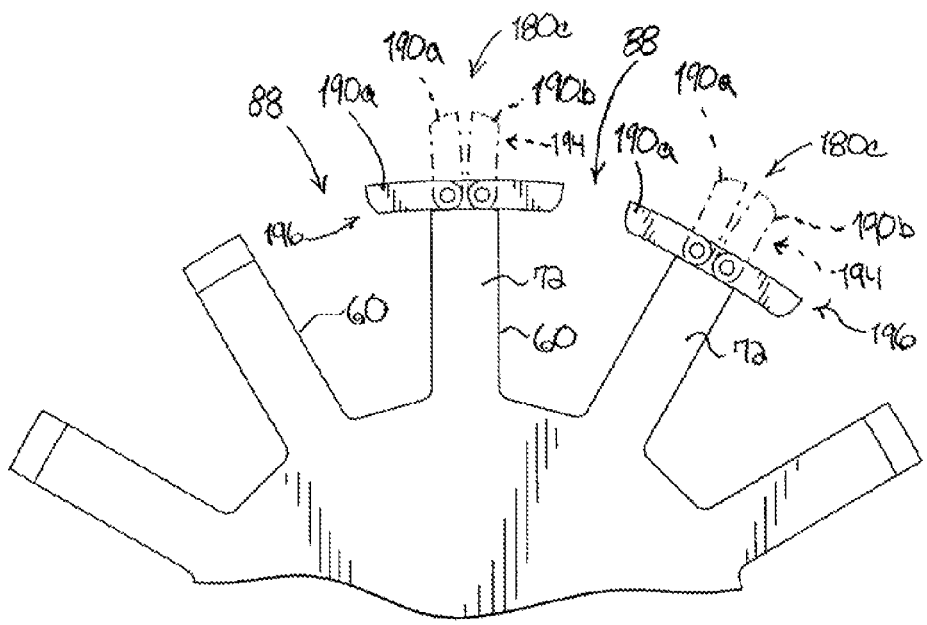
FIG. 17 is an end view of an armature core with separated tooth tips according to another embodiment of the invention.

In still other embodiments and as shown in FIG. 17, a tooth tip 180c is directly hinged to the tooth body 72, such that a first half of the tooth tip 190a and a second half of the tooth tip 190b are coupled to the tooth body 72. During winding, the first half of the tooth tip 190a and the second half of the tooth tip 190b are in a first position 194 that is substantially parallel to the tooth body. Following winding and compression, the tooth tips are pivoted to a second position 196, wherein each of the first half and second half of the tooth tips 190a, 190b cover a portion of the slot 60 or slot opening 88. The hinged tooth tip design eliminates the need for any machining of the teeth or tooth tips following winding.

Figure 18:
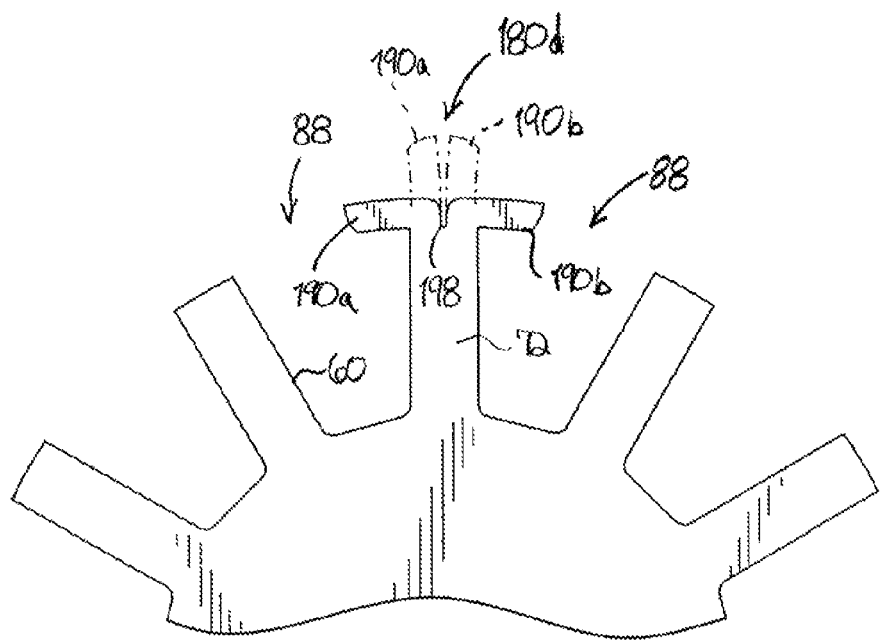
FIG. 18 is an end view of an armature core with separated tooth tips according to another embodiment of the invention.

In still other embodiments and as shown in FIG. 18, the tooth tip 180d is a single piece having a notch 198 formed on an outer end of the core. Following winding, the tooth tip halves 190a, 190b are bent or otherwise manipulated to a position similar to the outer diameter of the core, such that no machining or grinding is necessary.

FIG. 2 illustrates encapsulant coring. In the embodiment of FIG. 2, encapsulation material 202 is cored to expose the wire windings at ends of the core 50. In the illustrated embodiment, the motor 26 includes end caps 204 such that ends of the wire windings are not exposed. Coring the ends of the core 50 to expose the wires, increases the thermal properties of the armature 40 by allowing the exposed wires to release heat. The coring occurs during the mold process such that inserts in the mold die perform the coring procedure. The mold die inserts are movable to allow for the coring at different lengths and positions. As the wires are wound, the windings may not be the same dimension. Accordingly, the mold die inserts are configured to core at any depth as required by the application. Ribs of encapsulation 202 may remain on the exposed wire to deflect dust and debris during motor operation to protect the wires.

In some embodiments, more than 50% and as much as 90% or more of the slot may be filled with wire winding using the wire guide members, high slot fill wire guide members, or tooth tip members. The slot fill area is calculable to determine the most effective winding methods to increase slot fill percentage. Various factors are used to calculate the slot fill area and slot fill percentage. The spread factor is the ratio of wire area to open area in the fillable slot area. The spread factor is added to the total wire area to account for any imperfection in the wire lay resulting from the winding process. The spread factor is calculated using the following equation:

$$\text{Spread Factor} = (A_{fillable} - A_{wire}) A_{wire}.$$

Where, the $A_{fillable}$ is the amount of total fillable area available for winding:

$$A_{fillable} = A_{sp} + A_{wire}.$$

Figure 20:
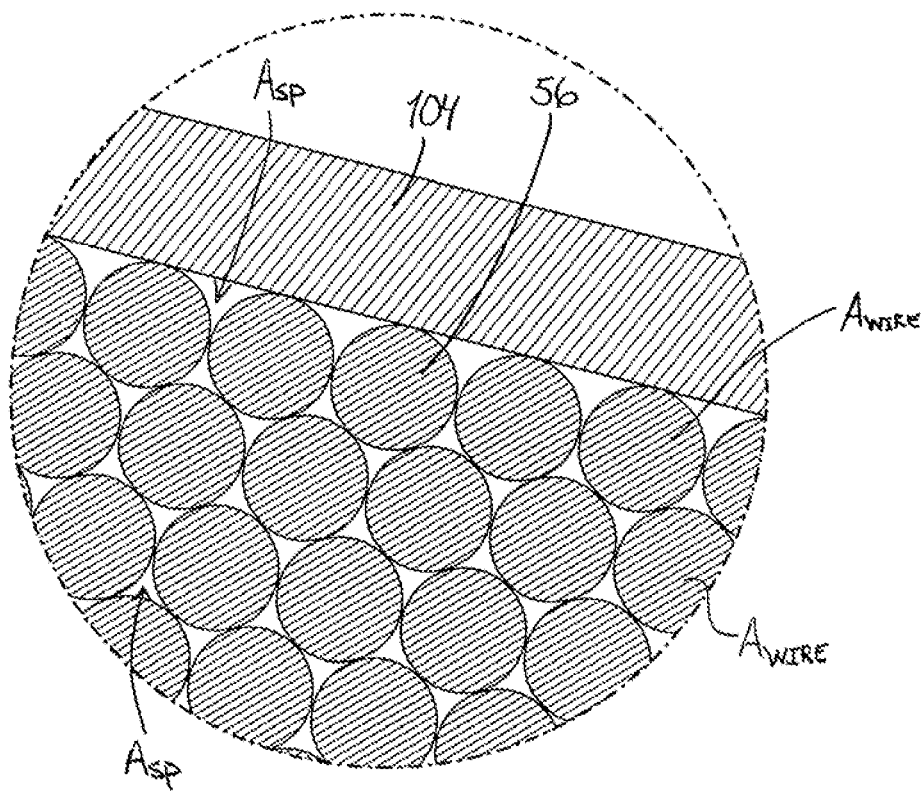
FIG. 20 is a detailed view of a portion of FIG. 5D.

$A_{sp}$ is the area of open space in the fillable slot area after compression (FIG. 20), and $A_{wire}$ is the total wire cross-sectional area (including insulation, but not including diameter reduction from wire stretch) of all the cross-sectional wire areas in the slot (FIG. 20).

The fill area 95 underneath a line 206 (FIG. 5D) and inside the slot liner is $A_{fillable}$. Line 206 is drawn along the underside 96 of the tooth tips 84 as illustrated in FIGS. 5C and 5D. The slot fill percent is then be calculated with the following equation:

$$\text{Slot Fill Percentage} = A_{wire}/A_{fillable}.$$

In one embodiment, with wire winding using the wire guide members, high slot fill wire guide members, or tooth tip members, discussed above, a slot fill percentage greater than or equal to 85 percent is achieved. In other embodiments, the slot fill percentage is greater than or equal to 80 percent, in other embodiments, greater than or equal to 75 percent, and in yet other embodiments, greater than or equal to 70 percent.

Figure 19A:
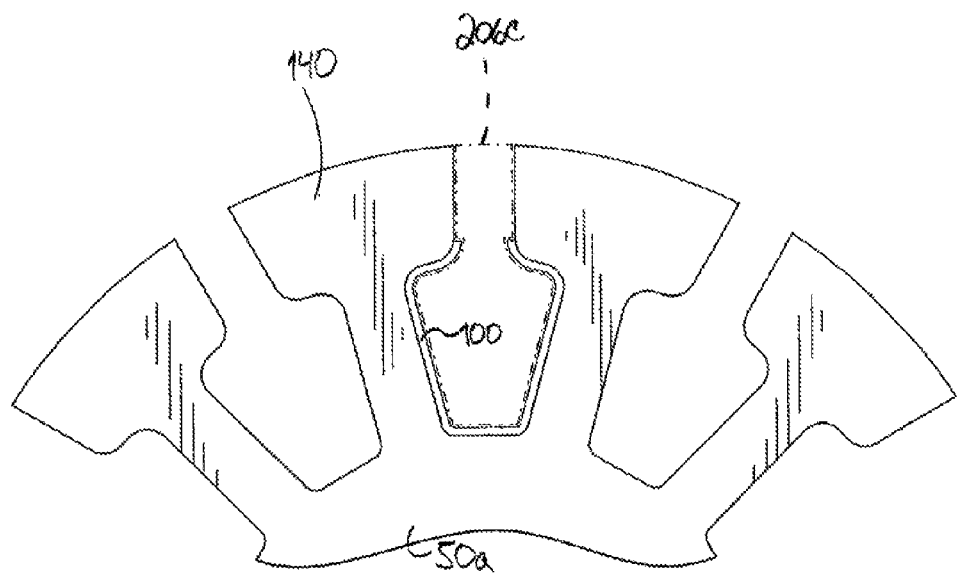
FIG. 19A is an end view of an armature illustrating a slot fill area according to one embodiment of the invention.
Figure 19B:
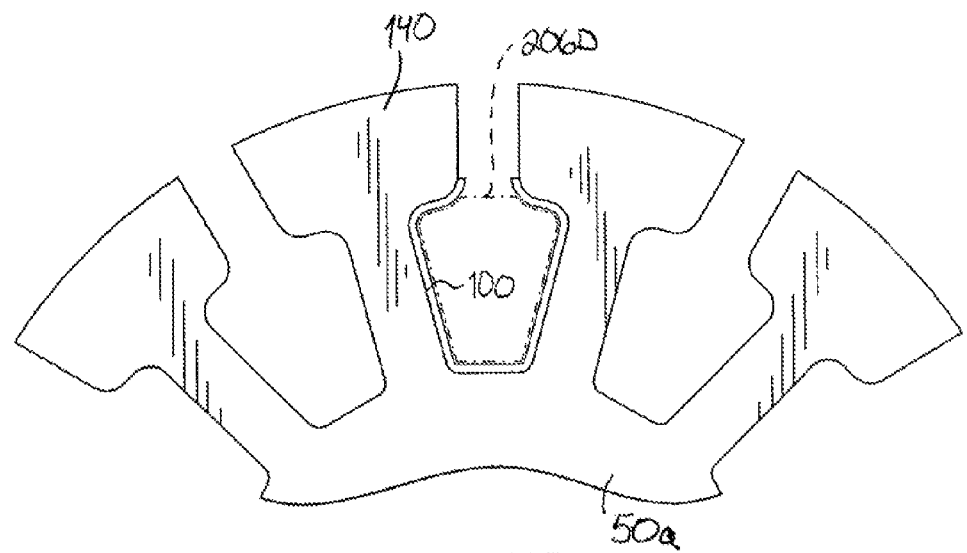
FIG. 19B is an end view of an armature illustrating a slot fill area according to another embodiment of the invention.

As shown in FIG. 19A and with an extended tooth tip 140 (discussed above with respect to FIG. 11), the fillable area 206C is measured as the total area of the slot to the outer diameter of the extended tooth tip 140 and contained inside of the slot liner 100. Using those parameters to calculate the fillable area, the fillable area 206C is 0.0493 in² in one embodiment. Taking into account the spread factor from conventional winding, 88 total wire conductors of 25 AWG may be wound in the extended tooth tip armature using conventional winding capabilities. However, by factoring in a compressed spread factor, 79 wires fit in a fillable slot area 206D located just underneath the tooth tips and inside the slot liner (FIG. 19B). Compressing the wires achieves a fill of approximately 86.31%, where the fillable area is measured as 0.0368 in². This is an increase in fill percentage over current winding methods. Similarly, the total number of conductors increases from fifty-six (56) 25 AWG heavy build wire in current winding methods to seventy-nine (79) 25 AWG heavy build wires. In still other embodiments, the fill percent may be greater than 86.31% or less than 86.31% based on an $A_{fillable}$ of 0.0368 in².

The maximum fill area for mechanical wire stacking is also calculable. The maximum mechanical fill percent is determined by stacking the maximum number of cross-sections of many wire gages (including insulation) in the compressed fillable space. The total wire cross-sectional area is then divided by the compressed fillable space. In mechanically stacking the wires, no wires or wire enamel are deformed. Mechanically stacking the wires without compression achieves a fill of approximately 77%. However, in other embodiments, the fill may be greater than 77% or less than 77%. Mechanically stacking the wires and further compressing the wires achieves a fill of approximately 87%. However, in other embodiments, the fill may be greater than 87% or less than 87%. Similarly, the total number of wire conductors increases from approximately seventy-one (71) 25 AWG heavy build wires to approximately seventy-nine (79) 25 AWG heavy build wires.

In still other embodiments, the slot fill area may be calculated based on a power-to-weight ratio or other slot fill ratio. In still other embodiments, the slot fill area may be calculated based on the weight per volume or the weight per density of the wire, including but not limited to taking the total maximum power of the motor divided by the volume and weight of the wire. In yet other embodiments, the slot fill area and slot fill percentage may be calculated in other ways.

Although particular constructions embodying independent aspects of the present invention have been shown and described, other alternative constructions will become apparent to those skilled in the art and are within the intended scope of the independent aspects of the present invention.

What is claimed is:

1. A method of manufacturing a motor with a shaft having an axis of rotation for a power tool comprising:
    providing an armature, the armature including,
        a yoke, and
        a first tooth and a second tooth that extend radially from the yoke to define a slot between the first tooth and the second tooth, each of the first tooth and the second tooth having an inner end adjacent the yoke and an outer end opposite the inner end;
    coupling a first wire guide member to the outer end of the first tooth;
    coupling a second wire guide member to the outer end of the second tooth;
    winding wire into the slot;
    after winding wire into the slot, compressing the wire radially into the slot;
    uncoupling the first wire guide member from the first tooth; and
    uncoupling the second wire guide member from the second tooth,
    wherein providing the armature includes providing the armature wherein a tooth tip defines the outer end of the first tooth and a tooth tip defines the outer end of the second tooth,
    wherein a slot fill area of the slot is defined as a cross-sectional area of the slot radially from the tooth tip of the first tooth and radially from the tooth tip of the second tooth taken toward the yoke perpendicular through the axis of the shaft,
    wherein a wire fill area is defined as the total cross-sectional area of the wire within the slot fill area, and
    wherein a slot fill percentage is defined as the slot fill area divided by the wire fill area, the method further comprising, winding the wire into the slot and compressing the wire into the slot to achieve a slot fill percentage of at least 70 percent.

2. The method of claim 1, wherein winding wire into the slot includes winding wire radially past the outer end of the first tooth and the outer end of the second tooth.

3. The method of claim 1, wherein compressing the wire radially into the slot includes guiding the wire radially into the slot using the first wire guide member and the second wire guide member.

4. The method of claim 3, wherein the outer end of the first tooth and the outer end of the second tooth define a slot opening therebetween, wherein guiding the wire radially into the slot includes guiding the wire through the slot opening using the first wire guide member and the second wire guide member.

5. The method of claim 1, wherein uncoupling the first wire guide member includes sliding the first wire guide member off of the first tooth, and wherein uncoupling the second wire guide member includes sliding the second wire guide member off of the second tooth.

6. The method of claim 1, wherein coupling the first wire guide member to the outer end of the first tooth includes directly coupling the first wire guide member to the outer end of the first tooth, and wherein coupling the second wire guide member to the outer end of the second tooth includes directly coupling the second wire guide member to the outer end of the second tooth.

7. The method of claim 6, wherein coupling the first wire guide member includes sliding the first wire guide member onto the first tooth, and wherein coupling the second wire guide member includes sliding the second wire guide member onto the second tooth.

8. The method of claim 1, wherein compressing the wire radially into the slot includes pushing a slot wedge into the slot to compress the wire radially into the slot.

9. The method of claim 1, wherein compressing the wire radially into the slot includes molding the wire into the slot to compress the wire radially into the slot.

10. The method of claim 1, wherein compressing the wire radially into the slot includes encapsulating the wire into the slot to compress the wire radially into the slot.

11. The method of claim 1, wherein uncoupling the first wire guide member includes machining the first wire guide member, and wherein uncoupling the second wire guide member includes machining the second wire guide member.

12. The method of claim 1, further comprising, after compressing the wire radially into the slot, pivoting the tip of the first tooth and the tip of the second tooth to cover at least a portion of the slot radially past the wire.

13. The method of claim 1, wherein the armature is configured to be coupled to the shaft, and the first tooth and the second tooth extend radially outward from the yoke.

14. The method of claim 1, further comprising, winding the wire into the slot and compressing the wire into the slot to achieve a slot fill percentage of at least 85 percent.

15. The method of claim 1, further comprising, winding the wire into the slot and compressing the wire into the slot to achieve a slot fill percentage of at least 80 percent.

16. The method of claim 1, further comprising, winding the wire into the slot and compressing the wire into the slot to achieve a slot fill percentage of at least 85 percent.

* * * * *